United States Patent
Diwakar

(10) Patent No.: US 10,324,818 B2
(45) Date of Patent: Jun. 18, 2019

(54) DATA ANALYTICS CORRELATION FOR HETEROGENEOUS MONITORING SYSTEMS

(71) Applicant: CA, Inc., New York, NY (US)

(72) Inventor: Kiran Prakash Diwakar, Pune (IN)

(73) Assignee: CA, Inc., New York, NY (US)

( * ) Notice: Subject to any disclaimer, the term of this patent is extended or adjusted under 35 U.S.C. 154(b) by 133 days.

(21) Appl. No.: 15/386,678

(22) Filed: Dec. 21, 2016

(65) Prior Publication Data

US 2018/0173603 A1 Jun. 21, 2018

(51) Int. Cl.
G06F 11/34 (2006.01)
G06F 11/30 (2006.01)
G06F 11/32 (2006.01)

(52) U.S. Cl.
CPC ...... G06F 11/3409 (2013.01); G06F 11/3006 (2013.01); G06F 11/328 (2013.01); G06F 11/3452 (2013.01); G06F 11/3476 (2013.01); G06F 2201/86 (2013.01)

(58) Field of Classification Search
None
See application file for complete search history.

(56) References Cited

U.S. PATENT DOCUMENTS

| | | | |
|---|---|---|---|
| 9,497,072 B2* | 11/2016 | Gates | G06F 11/0709 |
| 2008/0052393 A1 | 2/2008 | McNaughton et al. | |
| 2011/0161526 A1 | 6/2011 | Ravindran et al. | |
| 2012/0101800 A1* | 4/2012 | Miao | G06F 11/3612 703/22 |
| 2014/0032159 A1* | 1/2014 | Ramakrishnan | G06F 11/34 702/127 |
| 2015/0212663 A1 | 7/2015 | Papale et al. | |
| 2015/0295775 A1 | 10/2015 | Dickey | |
| 2015/0341212 A1 | 11/2015 | Hsiao et al. | |
| 2016/0217022 A1* | 7/2016 | Velipasaoglu | G06F 11/079 |
| 2016/0274990 A1* | 9/2016 | Addleman | G06F 11/3409 |

* cited by examiner

*Primary Examiner* — Tuan C Dao
(74) *Attorney, Agent, or Firm* — Gilliam IP PLLC

(57) ABSTRACT

Techniques for generating and rendering analytics data from system management data collected for multiple service domains are disclosed herein. In some embodiments, performance data are collected from multiple service domains that are each configured to determine performance metrics for one or more target system entities. The performance data for a first of the service domains is monitoring including, displaying metric objects representing variations in performance metrics for the first service domain and detecting a performance event for the first service domain, wherein the performance event is associated with a target system entity and a performance metric value. In response to said detecting the performance event, a metric object is displayed that indicates an association between an entity identifier (ID) of the target system entity and the performance metric value. An operational association between the target system entity associated with the performance event and a second of the service domains is identified. In response to selection of the event object, an analytics object is displayed that indicates analytics information generated based, at least in part, on a metric type of the performance metric value and the identified operational association between the target system entity associated with the performance event and the second service domain.

20 Claims, 8 Drawing Sheets

US 10,324,818 B2

DATA ANALYTICS CORRELATION FOR HETEROGENEOUS MONITORING SYSTEMS

BACKGROUND

The disclosure generally relates to the field of data processing, and more particularly to data analytics and presentation that may be utilized for higher level operations.

Big data analytics requires increasingly efficient and flexible techniques for visualizing or otherwise presenting data from a variety of sources and in a variety of formats. For example, big data analytics took can be designed to capture and correlate information in one or more databases. The analytics took may process the information to create output in the form of result reports, alarms, etc. The vast volume of information stored in and processed by analytics systems as well as the vast variety of information sources, variety of data formats, etc., poses challenges for efficiently evaluating and presenting analytics relating to the problem being solved or specific insight being sought.

BRIEF DESCRIPTION OF THE DRAWINGS

Aspects of the disclosure may be better understood by referencing the accompanying drawings.

DESCRIPTION

Figure 1:
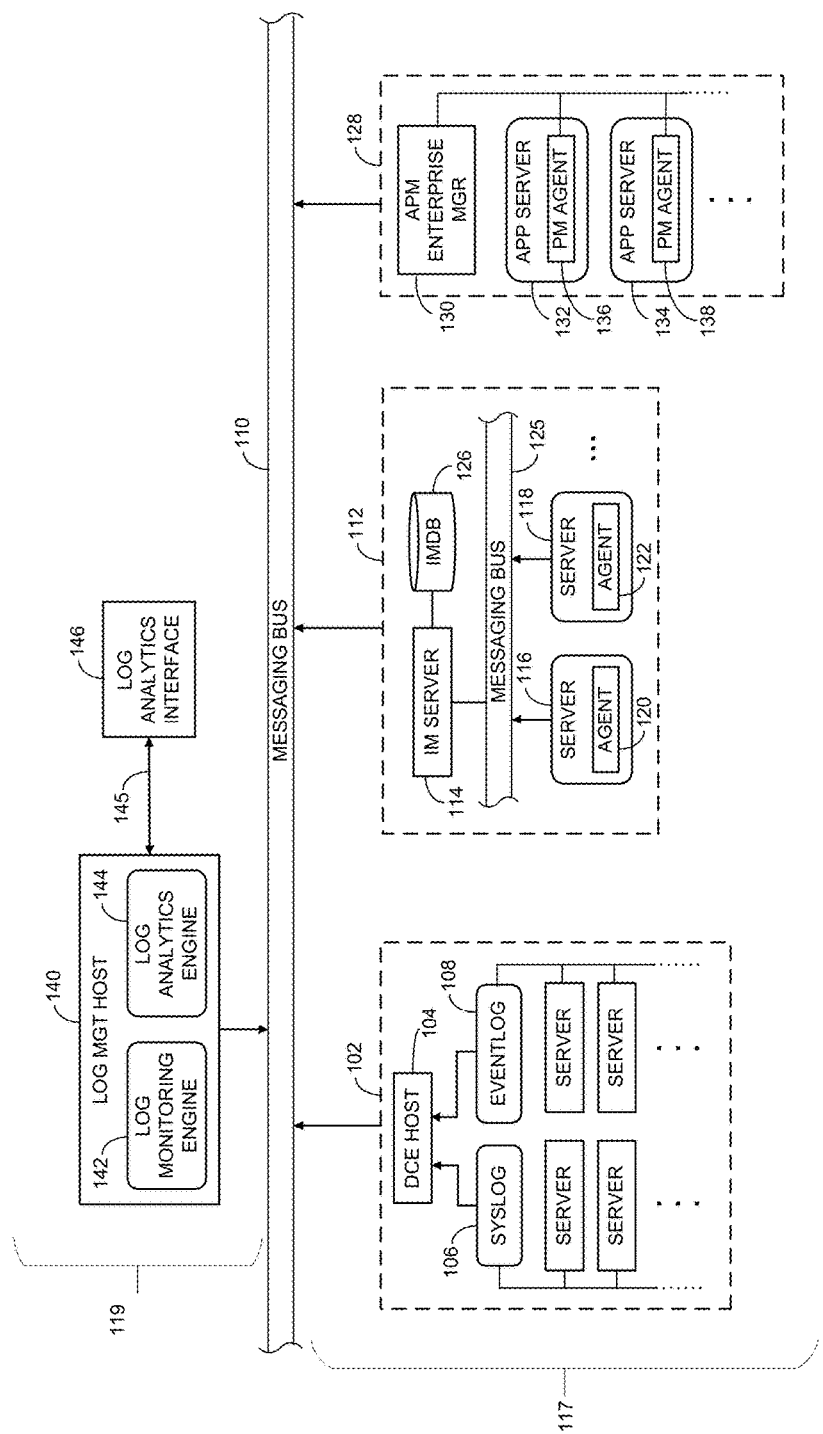
FIG. 1 is a block diagram depicting a heterogeneous system management architecture in accordance with some embodiments.

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

Overview

In general, performance monitoring and management systems include native presentation tools such as GUIs that include sets of display objects associated with respective software and hardware monitoring/management applications. The monitoring/management domain of each monitoring system may or may not overlap the domain coverage of other such tools. Given multiple non-overlapping or partially overlapping monitoring domains (referred to herein alternatively as service domains) and variations in the type and formatting of collected information in addition to the massive volume of the collected information, it is difficult to efficiently present performance data across service domains while enabling efficient root cause analysis in the context of the problem that has been discovered.

Embodiments described herein include components and implement operations for collecting, configuring, and displaying logged and real-time system management data. System performance data are individually collected by multiple service domains and the performance, configuration, informational and other kinds of data for a set of two or more service domains may be collected by a log management host. Each of the service domains includes a specified set of system entities including software, firmware, and/or hardware entities such as program code modules. The services domains may further include service agents or agentless collection mechanisms and a collection engine that detect, measure, or otherwise determine and report performance data for the system entities (referred to herein alternatively as "target system entities" to distinguish from the monitoring components). The service agents or agentless mechanisms deployed within each of the service domains are coordinated by a system management host that further records the performance data in a service domain specific dataset, such as a database and/or performance data logs.

Each of the management/monitoring systems may be characterized as including software components that perform some type of utility function, such as performance monitoring, with respect to an underlying service domain of target system entities (referred to herein alternatively as a "target system" or a "system"). A target system may be characterized as a system configured, using any combination of coded software, firmware, and/or hardware, to perform user processing and/or network functions. For example, a target system may include a local area network (LAN) comprising network connectivity components such as routers and switches as well as end-nodes such as host and client computer devices.

In cooperation with service agents or agentless collection probes distributed throughout a target system (e.g., a network), a system management collection engine retrieves performance data such as time series metrics from system entities. The performance data may include time series metrics collected in accordance with collection profiles that are configured and updated by the respective management system. The collection profiles may be configured based, in part, on specified relations (e.g., parent-child) between the components (e.g., server-CPU) that are discovered by the management system itself. The collection profiles may also include service domain grouping of system entities that designate specified system entities as belonging to respective collection/service domains managed by corresponding management hosts. For each of multiple management systems deployed for a given target system, system management data may be continuously or intermittently retrieved by one or more management clients for display on a display output device. Embodiments described herein include techniques for efficiently retrieving and displaying system management data in association with system events such as application crashes and performance metrics exceeding specified thresholds.

Example Illustrations

FIG. 1 is a block diagram depicting a heterogeneous system management architecture in accordance with some embodiments. The depicted architecture includes a monitoring infrastructure 117 comprising service domains 102, 112, and 128. The architecture further includes an analytics infrastructure 119 comprising a log management host 140 and a log analytics interface 146. The components of analytics infrastructure 119 communicate with components of monitoring infrastructure 117 via a messaging bus 110. The analytics information to be presented is derived, at least in part, from operational performance data detected and collected within service domains 102, 112, and 128. Each of service domains 102, 112, and 128 includes a specified (e.g., by monitor system configuration) set of target system entities that may each include combinations of software and/or hardware forming components, devices, subsystems, and systems for performing computing and networking functions. As utilized herein, a "target system entity" generally refers to a hardware or software system, subsystem, device, or component (collectively referred to as "components" for description purposes) that is configured as part of the target system itself, rather than part of the monitoring system that monitors the target system. For instance, service domain 102 includes multiple server entities. The target system entities within service domain 112 also include multiple servers including servers 116 and 118. The target system entities within service domain 128 include application servers 132 and 134.

As further shown in FIG. 1, each of service domains 102, 112, and 128 further include program components that comprise all or part of a respective monitoring system for the service domain. Such monitoring system components may be configured to perform support utility tasks such as performance monitoring, fault detection, trend analysis, and remediation functions. A monitoring system typically employs operational/communication protocols distinct from those employed by the target system components. For example, many fault management systems may utilize some version of the Simple Network Management Protocol (SNMP). As utilized herein, a "service domain" may be generally characterized as comprising a monitoring system and a specified set of target system entities that the monitoring system is configured to monitor. For example, a distributed monitoring system may include multiple management system program instances that are hosted by a management system host. In such a case, the corresponding service domain comprises the management system program instances, the management system host, and the target system entities monitored by the instances and host.

The monitoring system components within service domain 102 include a syslog unit 106 and an eventlog unit 108. As illustrated, syslog unit 106 collects operational data such as performance metrics and informational data such as configuration and changes on the target systems from messages transacted between syslog unit 106 and a plurality of servers. Similarly, eventlog unit 108 collects operational data such as performance events (e.g., events triggering alarms) and informational data such as configuration and changes on the target systems from agentless communications between eventlog unit 108 and a plurality of servers. A distributed computing environment (DCE) host 104 serves as the monitoring system host for service domain 102 and collects the log data from syslog unit 106 and eventlog unit 108. In the foregoing manner, service domain 102 is defined by the system management configuration (i.e., system monitoring configuration of DCE host 104, syslog unit 106, and eventlog unit 108) to include specified target system servers, which in the depicted embodiment may comprise hardware and software systems, subsystems, devices, and components. In some embodiments, syslog unit 106 and eventlog unit 108 may be configured to monitor and detect performance data for application programs, system software (e.g., operating system), and/or hardware devices (e.g., network routers) within service domain 102.

Service domain 112 includes a monitoring system comprising an infrastructure management (IM) server 114 hosting an IM database 126. IM server 114 communicates with multiple collection agents including agents 120 and 122 across a messaging bus 125. Agents 120 and 122, as well as other collection agents not depicted within service domain 112, are configured within service domain 112 to detect, measure, or otherwise determine performance metric values for corresponding target system entities. The determined performance metric data are retrieved/collected by IM server 114 from messaging bus 125, which in some embodiments, may be deployed in a publish/subscribe configuration. The retrieved performance metric data and other information are stored by IM server 114 within a log datastore such as IM database 126, which may be a relational or a non-relational database.

The monitoring system components within service domain 128 include an application performance management (APM) enterprise manager 130 that hosts performance management (PM) agents 136 and 138 that are deployed within application servers 132 and 134, respectively. Application servers 132 and 134 may be server applications that host client application instances executed on client stations/devices (not depicted). In some embodiments, application servers 132 may execute on computing infrastructure including server hardware and operating system platforms that are target system entities such as the servers within service domain 112 and/or service domain 102.

In addition to the monitoring infrastructure 117 comprising the multiple service domains, the depicted environment includes analytics infrastructure 119 that includes program instructions and other components for efficiently processing and rendering analytics data. Analytics infrastructure 119 includes log management host 140 that is communicatively coupled via a network connection 145 to log analytics interface 146. As explained in further detail with reference to FIGS. 2-7, log management host 140 is configured using any combination of software, firmware, and hardware to retrieve or otherwise collect performance metric data from each of service domains 102, 112, and 128.

Log management host 140 includes a log monitoring engine 142 that communicates across a messaging bus 110 to poll or otherwise query each of the service domain hosts 104, 114, and 130 for performance metric log records stored in respective local data stores such as IM database 126. In some embodiments, log management host 140 retrieves the service domain log data in response to client requests delivered via analytics interface 146. Log management host 140 may record the collected service domain log data in a centralized data storage structure such as a relational database (not depicted). The data storage structure may include data tables indexed in accordance with target system entity ID for records corresponding to those retrieved from the service domains. The tables may further include additional indexing mechanisms such as index tables that logically associate performance data between service domains (e.g., index table associating records between service domains 102 and 128).

Log management host 140 further includes a log analytics engine 144 that is configured using program code or other logic design implementation to process the raw performance metric data collected by log monitoring engine 142 to generate analytics data. For instance, log analytics engine 144 may be configured to compute aggregate performance metrics such as average response times among multiple target system entities. In some embodiments, log analytics engine 144 records the analytics data in analytics data records that are indexed based on target system entity ID, target system entity type, performance metric type, or any combination thereof.

Figure 2:
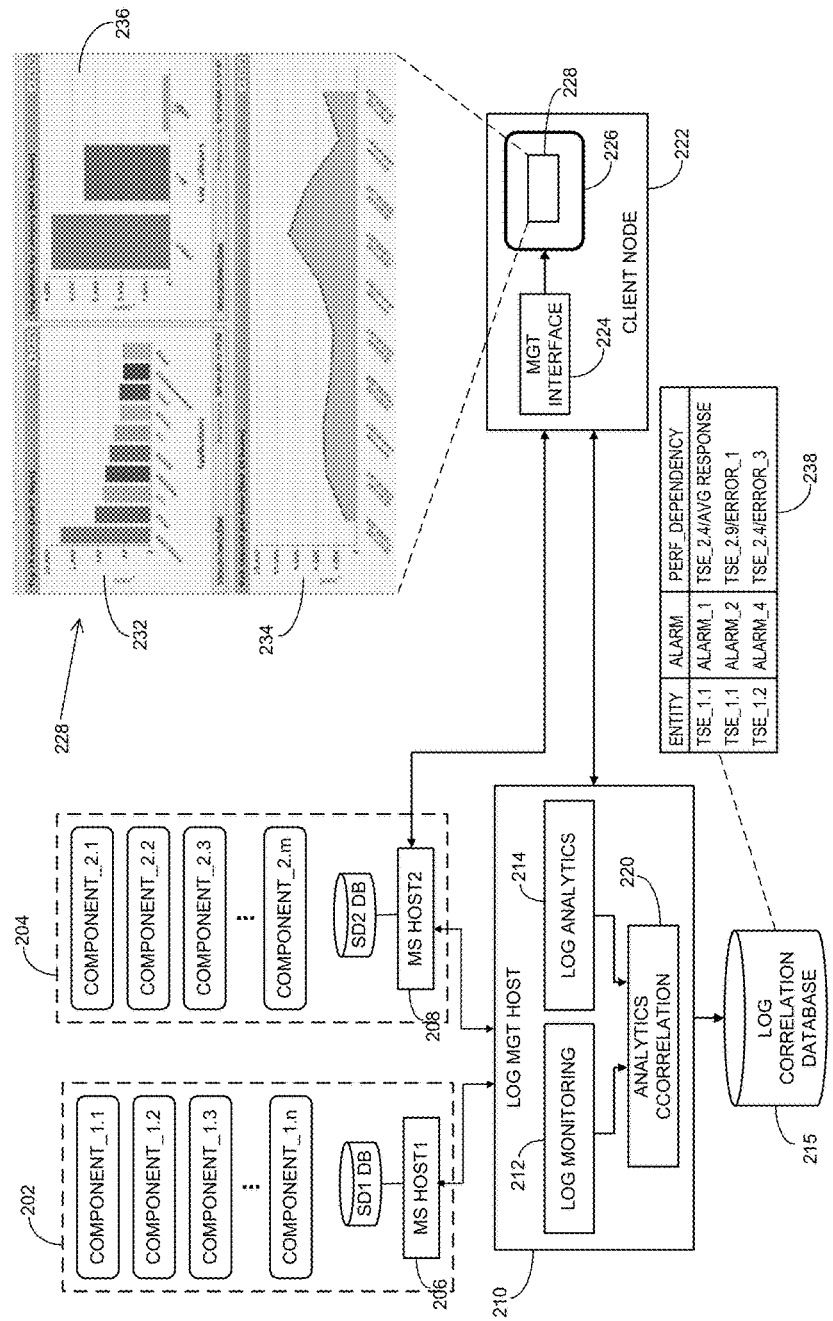
FIG. 2 is a block diagram depicting a system management analytics presentation system in accordance with some embodiments.

FIG. 2 is a block diagram depicting a system management analytics presentation system such as may be implemented with the environment shown in FIG. 1 in accordance with some embodiments. The analytics presentation system includes a log management host 210 that may include the features depicted and described with reference to FIG. 1. As shown, log management host 210 is communicatively coupled with a client node 222 and with service domains 202 and 204. Log management host 210 is configured, using any combination of software, firmware, and/or hardware, to facilitate real-time, inline processing and rendering of analytics data within client node 222 based on analytics information generated from service domain performance metric data.

As shown in FIG. 2, service domains 202 and 204 include respective sets of specified target system entities—COMPONENT_1.1 through COMPONENT 1.n and COMPONENT_2.1 through COMPONENT_2.m, respectively. While not expressly depicted in FIG. 2, each of service domains 202 and 204 further includes monitoring system components for detecting, measuring, or otherwise determining performance metrics for the respective set of target system entities. As shown in FIG. 1, the monitoring system components may comprise agents or agentless metric collection mechanisms. The raw performance data collected for the service domain entities are recorded by monitoring system hosts 206 and 208 in respective service domain databases SD1 and SD2.

The performance data for each of service domains 202 and 204 may be accessed by a management interface application 224 executing in client node 222. For instance, management interface application 224 may be a system monitor client such an application performance client that may connect to and execute in coordination with monitoring system host 208. In such a configuration, management interface application 224 may request and retrieve performance metric data from the SD2 database based on queries sent to monitoring system host 208. The performance data may be retrieved as log records and processed by management interface 224 to generate performance metric objects to be displayed on a display device 226. For instance, the performance data may be displayed within a window object 228 comprising performance metric objects 232, 234, and 236.

The depicted analytics presentation system further includes components within log management host 210 that interact with management interface 224 as well as service domains 202 and 204 to render system management data in a heterogeneous monitoring environment. Log management host 210 includes a log monitoring unit 212 that is configured to poll or otherwise request and retrieve performance metric data from service domains 202 and 204. For example, log monitoring unit 212 may include program instructions for processing client application requests from client node 222 to generate log monitoring profiles. The log monitoring profiles may include search index keys such as target system entity IDs and/or performance metric type that are used to access and retrieve the resultant selected log records from the SD1 and SD2 databases.

Log management host 210 further includes components for processing the service-domain-specific performance data to generate analytics information that may be centrally recorded and utilized by individual monitoring system clients during real-time system monitoring. In one aspect, log management host 210 comprises a log analytics unit 214 for generating intra-domain analytics information. Log analytics unit 214 may be configured to generate cumulative or otherwise aggregated metrics such as averages, maximum, and minimum performance metric values from among multiple individual time-series values and/or for multiple target system entities. Log analytics unit 214 may, for example, execute periodic reports in which specified performance metric records are retrieved from one or both of service domains 202 and 204 based on specified target entity ID, target entity category (e.g., application server), and/or performance metric type.

Log management host 210 further includes an analytics correlation unit 220 that processes input from either or both of log monitoring unit 212 and log analytics unit 214 to generate performance correlation records within a log correlation database 215. For example, analytics correlation unit 220 may generate performance correlation records within a performance correlation table 238 within database 215. The depicted row-wise records each include an ENTITY field and an ALARM field, both (i.e., the combination) association with a PERF_DEPENDENCY field. The record entries TSE_1.1, TSE_1.1, and TSE_1.2 in the ENTITY field specify either a particularly target system entity ID (CPU1.1) or may specify a target system entity category (e.g., CPU). As shown, the first two records specify the same target system entity ID or category, TSE_1.1, while the third record specifies a second target system entity ID or category, TSE1.2.

The differences between the first and second records relate to the ALARM and PERF_DEPENDENCY entries corresponding to the respective identical ENTITY entry TSE_1.1. Namely, in the first record, ENTITY entry TSE1.1 is associated with an ALARM entry ALARM_1 and a PERF_DEPENDENCY entry TSE_2.4/AVG RESPONSE. The TSE1.1 entry specifies a device ID or device category for a device within service domain 202 (e.g., COMPONENT_1.2). Entry ALARM_1 identifies a particular alarm event that specifies, typically on a client display, a target system entity ID (e.g., ID device belong to target system entity category CPU) in association with a performance metric value (e.g., percent usage). The TSE_2.4 portion of the depicted TSE_2.4/AVG RESPONSE entry specifies the ID or category/type of a target system entity in another service domain (e.g., COMPONENT_2.2. in service domain 204). The AVG/RESPONSE portion of the TSE_2.4/AVG RESPONSE entry specifies a performance metric type and value (e.g., 0.88 sec average response time). The second record in table 238 associates the same target system entity or entity category with a different alarm entry, ALARM_2, and a different performance dependency entry, TSE_2.9/ERROR1. As depicted and described in further detail with reference to FIGS. 3-7, the components of log management host 210 in cooperation with a monitoring client application may process performance metric data from several different service domains to generate and display analytics information that enable efficient triage and diagnosis of alarm events within a heterogeneous monitoring environment.

Figure 3:
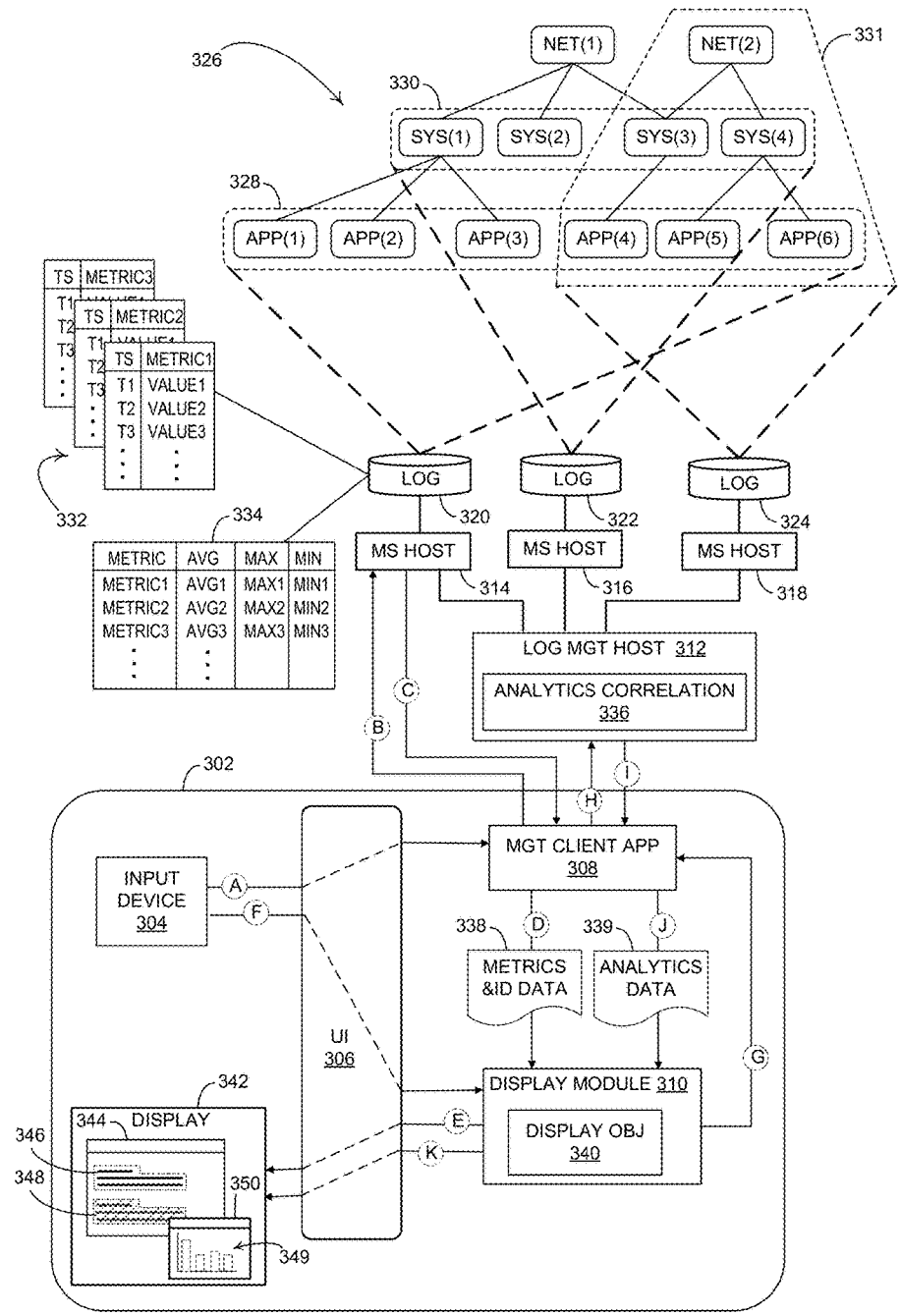
FIG. 3 is a block diagram illustrating a system architecture for rendering system management analytics data in accordance with some embodiments.

As further disclosed herein, analytics components may be operationally combined with service domain specific performance monitoring to enable generation and rendering of analytics information from different monitoring/management tools in a manner optimizing efficient real-time utilization of the information. FIG. 3 is a block diagram illustrating a system for rendering system analytics data in accordance with some embodiments. The system includes a monitoring system hosts 314, 316, and 318 and a client node 302. Client node 302 comprises a combination of hardware, firmware, and software configured to communicate with implement system management data transactions with one or more of the monitoring system hosts. While not expressly depicted, each of the monitoring system hosts may include, in part, a host server that is communicatively connected to a management client application 308 within client node 302.

Each of monitoring system hosts 314, 316, and 318 may include a collection engine for collecting performance metric data from target system entities within a target system and recording the data in performance logs 320, 322, and 324, respectively. Within the logs, the metric data may be stored in one or more relational tables that may comprise multiple series of timestamp-value pairs. For instance, performance log includes multiple files 332 each recording a series of timestamps $T_1$-$T_N$ and corresponding metric values $Value_1$-$Value_N$ collected for one or more of the system entities. Performance log 320 further includes a file 334 containing metric values computed from the raw data collected in association with individual timestamps. As shown file 334 includes multiple records that associated a specified metric with computed average, max, and min values for the metrics specified within files 332. The performance metric data is collected and stored in association with system entity profile data corresponding to the system entities from/for which the metric data is collected. The profile data may be stored in relational tables such as management information base (MIB) tables (not depicted).

Each of monitoring system hosts 314, 316, and 318 and corresponding monitoring agents (not depicted) are included in a respective service domain for a target system. In FIG. 3, the target system is depicted as a tree structure 326 comprising multiple hierarchically configured or otherwise interconnected nodes. As shown, the target system represented by tree structure 326 comprises two networks NET(1) and NET(2) with NET(1) including three subsystems, SYS (1), SYS(2), and SYS(3), and NET(2) including SYS(3) and SYS(4). The subsystems may comprise application server systems that host one or more of applications APP(1) through APP(6). As further shown, some of the target system entities represented within tree structure 326 are included in one or more of three service domains 328, 330, and 331. For instance, all of the applications APP(1) through APP(6) are included in service domain 328, all subsystems SYS(1) through SYS(4) are included in service domain 330, and all hierarchically related components of NET(2) are included in service domain 331.

The depicted system further includes a log management host 312 that includes components for correlating performance metric data from the services domains 328, 330, and 331 to generate analytics information that can be utilized to efficiently access and render diagnostics information for a monitoring system client within client node 302. Client node 302 includes a user input device 304 such as a keyboard and/or display-centric input device such as a screen pointer device. A user can use input device 304 to enter commands (e.g., displayed object select) or data that are processed via a UI layer 306 and received by the system and/or application software executing within the processor-memory architecture (not expressly depicted) of client node 302.

User input signals from input device 304 may be translated as keyboard or pointer commands directed to client application 308. In some embodiment, client application 308 is configured, in part, to generate graphical objects, such as a metric object 340 by a display module 310. Graphical representations of metric object 340 are rendered via UI layer 306 on a display device 342, such as a computer display monitor.

The following description is annotated with a series of letters A-I. These letters represent stages of operations for rendering system management data. Although these stages are ordered for this example, the stages illustrate one example to aid in understanding this disclosure and should not be used to limit the claims. Subject matter falling within the scope of the claims can vary with respect to the order and type of the operations.

At stage A, input device 304 transmits an input signal via UI layer 306 to client application 308, directing client application 308 to request system monitoring data from monitoring system host 314. For instance, an OpenAPI REST service such as the OData protocol may be implemented as a communication protocol between client application 308 and monitoring system host 314. At stage B, monitoring system host 314 retrieves the data from performance log 320 and begins transmitting the data to client application 308 at stage C. The retrieved data may include raw and/or processed performance metric data recorded in performance log 320 such as periodic performance metrics as well as performance metrics that qualify, such as by exceeding a threshold, as performance events. The retrieved data further includes associated entity ID information. As stage D, the performance metric data 338 including the associated entity ID and performance metric value information is processed and sent by client application 308 to display module 310. Display module 310 generates resultant display objects 340, and at stage E, the display objects are processed by display module 310 via UI 306 to render/display a series of one or more metric objects including metric objects 346 and 348 within client monitoring window 344.

Figure 4A:
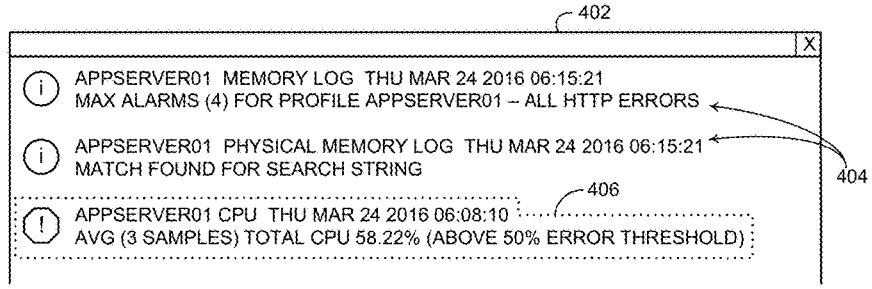
FIG. 4A depicts a monitoring console alarm panel that includes a displayed metric object in accordance with some embodiments.

As depicted and described in further detail with reference to FIG. 4A, metric object 340 may comprise a text field specifying a target system entity ID associated with a performance metric value. Referring to FIG. 4A in conjunction with FIG. 3, an example monitoring window 402 is depicted including multiple metric objects such as may be representative of metric objects 346 and 348. Monitoring window 402 includes metric objects 404 in the form of monitoring messages indicating operational status of an application server APPSERVER01. Monitoring window 402 further includes a metric object 406 that specifies a CPU usage performance metric value indicating that the total CPU usage supporting APPSERVER01 is at 58.22%.

At stage F, display module 310 receives a signal via UI 306 from input device 304 corresponding to an input selection of metric object 348 within window 341. For instance, the input selection may comprise a graphical UI selection of metric object 348. In response to the selection signal, display module 310 transmits a request to client application 308 requesting analytics information corresponding to the target system entity ID and performance metric specified by metric object 348 (stage G). In response to the request, client application 308 transmits a request to log management host 312 requesting analytics information (stage H).

As depicted and described in further detail with reference to FIG. 6, an analytics correlation unit 336 within log management host 312 generates analytics information based on performance correlations between service domains. For instance, if service domain 330 contains the target system entity specified by metric object 348, analytics correlation unit 336 may determine performance correlations between at least one target system entity in either or both of service domains 328 and 331 and the target system entity specified by metric object 348. At stage I, log management host 312 forwards the retrieved/generated analytics information to client application 308. At stage J, client application 308 passes the analytics information 339 to display module 310, which displays the analytics information as one or more analytics objects 349 within an analytics window 350 via UI 202 at stage K.

Figure 4B:
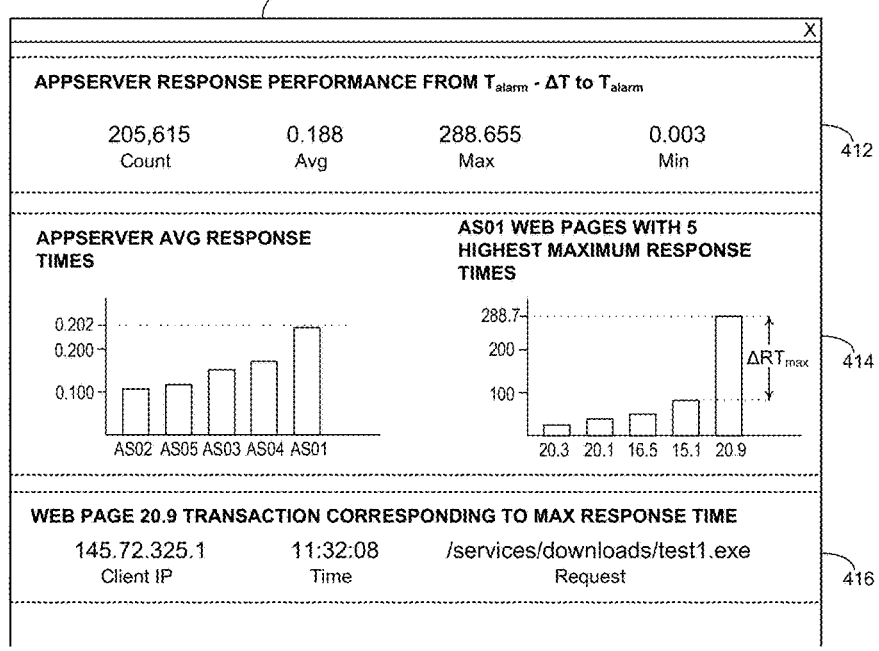
FIG. 4B illustrates displayed analytics objects that are generated in response to selection of a metric object in accordance with some embodiments.
Figure 4C:
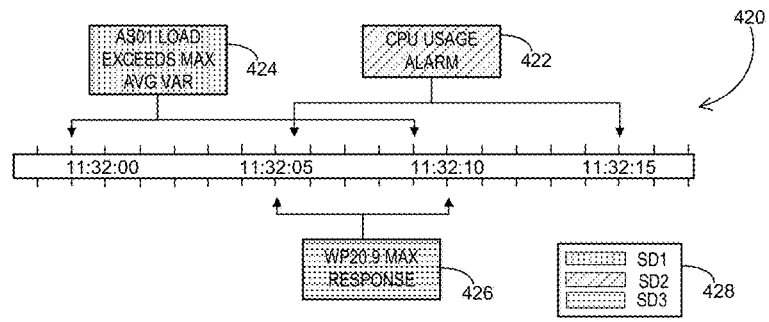
FIG. 4C depicts a correlated analytics object generated in response to selection of a metric object in accordance with some embodiments.

As depicted and described in further detail with reference to FIGS. 4B and 4C, analytics objects 349 may comprise displayed objects that indicate analytics information derived from performance metrics data that has been correlated between two or more service domains. As utilized herein, "analytics information" and/or "analytics data," are distinct from "performance metrics" and/or "performance metric data" which comprise data collected by monitoring systems within respective service domains. In one aspect, the analytics information is information/data derived by an interpretive function, formula, or other data-transformative operation in response to detecting a performance event such as an alarm indicating that a performance metric value exceeds a specified threshold. Referring to FIG. 4B in conjunction with FIG. 3, an example analytics window 410 is depicted as including analytics objects 412, 414, and 416. Analytics object 412 indicates response performance values for application servers that are included a service domain different than the service domain to which the APPSERVER01 CPU (specified in metric object 406) is included. As shown, analytics object 414 includes a bar chart indicating the average response times for application servers AS01 through AS05, with AS05 indicated as having a highest response time. Analytics object 414 includes a second bar chart indicating maximum response times for web pages 20.3, 20.1, 16.5, 15.1 and 20.9, which have been determined to be operationally related to application server AS01. As shown, web page 20.9 is indicated as having a highest maximum response time as well as a response time differential from the next-highest value (for web page 15.1) that exceeds a specified threshold. Analytics object 416 indicates client IP, time, and request URL information associated with web page 20.9.

The analytics objects depicted in FIG. 4B display analytics information, such as comparative application server and web page response times, which may be useful for identifying relative performance trends among target system entities belong to different service domains. In another aspect, analytics objects may provide contextual information particularly relating to cross service domain performance information that may have temporal or event sequence significance. For example, FIG. 4C depicts a correlated analytics object 420 that may be generated and displayed in accordance with some embodiments.

Correlated analytics object 420 comprises a common timeline spanning a specified period over which performance metrics between a first service domain (e.g., service domain including APPSERVER01 CPU) and two other service domains. For instance, a CPU USAGE ALARM event object 422 points to a timespan over which an APPERVER01 CPU alarm is active. Analytics object 420 further includes an event object 424 pointing to a span of time over which application server AS01 exceeded a specified maximum average variation value. On the same timeline, analytics object 420 further includes an event object 426 that points to an interval over which web page 20.9 met or exceeded a specified maximum response time. Timeline analytics object 420 further includes a legend 428 that associates each of the respectively unique visual indicators (e.g., different colors or other visual identifiers) assigned to each of event objects 422, 424, and 426 and a respective service domain.

Figure 5:
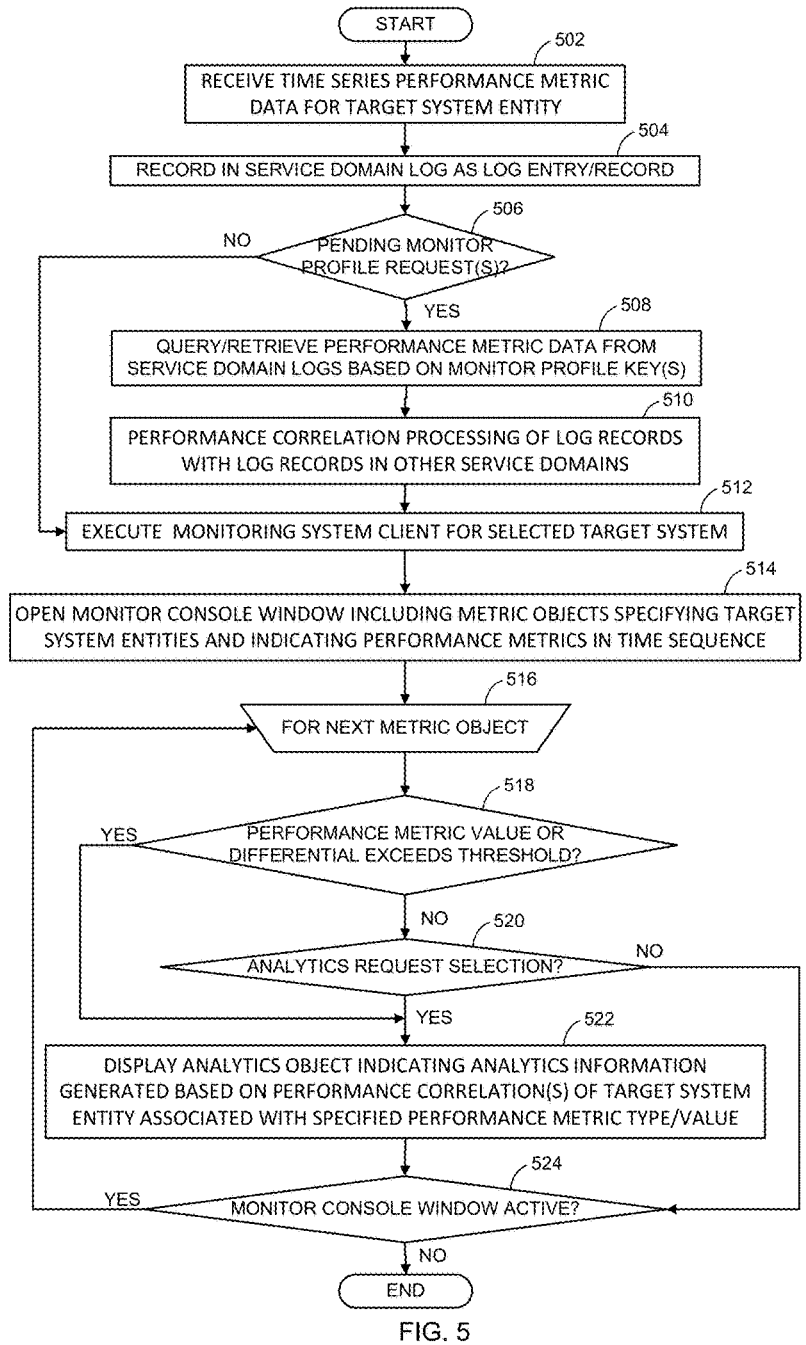
FIG. 5 is a flow diagram illustrating operations and functions for processing system management data in accordance with some embodiments.

FIG. 5 is a flow diagram illustrating operations and functions for processing system management data in accordance with some embodiments. The operations and functions depicted in FIG. 5 may be performed by one or more of the systems, devices, and components depicted as described with reference to FIGS. 1-3. The process begins as shown at block 502 with two or more monitor system host retrieving performance metric data for one or more target system entities with their respective service domains. The monitoring hosts typically receive the performance metric data from data collection mechanisms such as service agents deployed in the target system. The monitoring systems hosts record the received performance metric data within respective data stores such as performance data logs and/or databases (block 504).

As shown beginning at inquiry block 506, a log management host determines whether pending monitor profile requests are active. If so, a log monitoring unit in the log management host utilizes keys included in the monitor profile requests to query the performance logs for each of the service domains to retrieve performance metric data (block 508). At block 510, a log analytics unit determines performance correlations between the target system entities across the different service domains and processes the collected service-domain-specific performance metrics based on the determined correlations. For example, the log analytics unit may identify relational table records within a log correlation database (e.g., database 215) that associate application target system entities monitored within a first service domain with infrastructure target system entities monitored in a second service domain. The identified records may be indexed by target system ID and service domain ID as keys enabling the cross-comparison between entities in different service domains within a same overall target system.

The identified records may further include each include target system configuration data, enabling the log analytics unit to determine target system associations between target system entities within the same target system but belong to different service domains. For example a set of one or more hardware entities (e.g., CPUs) and/or system platform entities (e.g., operating system type and version) may be associated via target system configuration information within the identified records as being operationally associated (e.g., CPU1 identified as infrastructure supporting a particular application server). In this example, the determined performance correlation may be a relation between the level of CPU utilization and response times for the application server. Additional performance correlation in which a particular performance metric type may be performed in subsequent processing related to an input selection of a metric object.

At block 512, a monitoring system client that is native to one of the service domains is initiated such as from a client node. As part of execution of the monitoring system client, a monitor console window is displayed on a client display device (block 514). The console window displays metric objects that indicate performance metric values in association with target entity IDs and may be sequentially displayed as performance data is retrieved from the service domain.

Beginning as shown at block 516, the monitoring system client with or without user interface input may process each of the displayed metric objects to determine whether corresponding analytics information will be generated. For example, if at block 518, the client application determines that the performance metric value exceeds a specified threshold, control passes to block 522 at which the client in cooperation with the log management host performs additional performance correlation (in addition to that performed at block 510) between the specified target system entity and target system entities in other service domains to generate analytics information to be indicated in a displayed analytics object. Alternatively, control passes to block 522 in response to the client application detecting an input selection of the metric object at block 520. The analytics object displayed at block 522 includes text and graphical analytics information that is generated based on the performance metric value, the associated target system entity ID, and operational/performance correlations determined at block 510. The foregoing operations continue until the monitor console window and/or the client application is closed (block 524).

Figure 6:
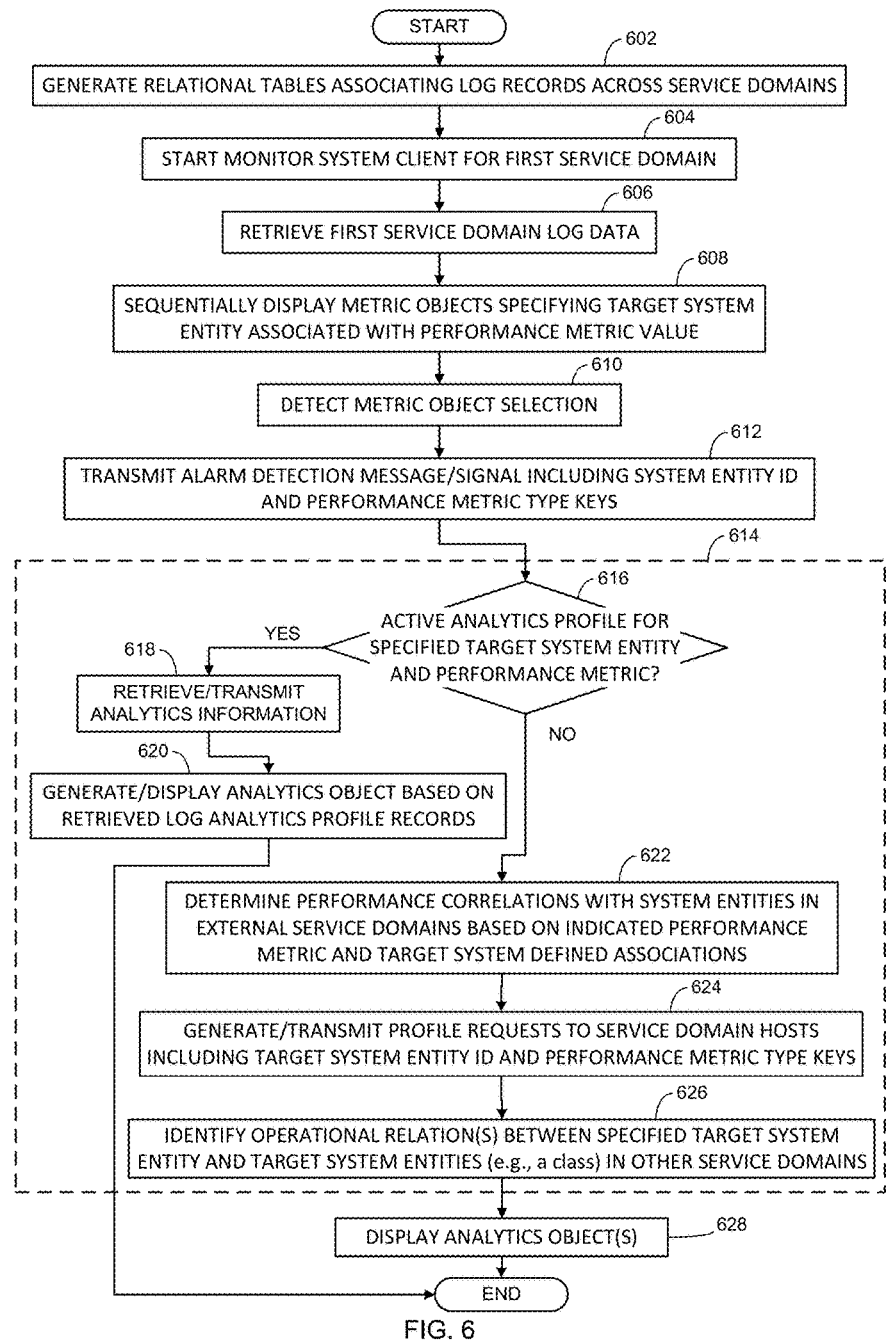
FIG. 6 is a flow diagram depicting operations and functions for presenting analytics information in accordance with some embodiments.

FIG. 6 is a flow diagram depicting operations and functions for presenting analytics information in accordance with some embodiments. The operations and functions depicted in FIG. 6 may be performed by one or more of the systems, devices, and components depicted as described with reference to FIGS. 1-3. The process begins as shown at block 602 with a log management host generating relational tables that associate log records across two or more service domains. At block 604, a client application native to one of the service domains is activated and performance metrics recorded in a corresponding performance log are retrieved (block 606). The client application processes the performance log records to generate and sequentially display metric objects that each specify a target system entity included in the service domain in association with a performance metric value (block 608). In response to detecting selection of one of the metric objects (block 610), the client application transmits a corresponding alarm or message including the target system entity ID and performance metric type (e.g., CPU usage alarm) to the log management host (block 612).

As shown by the blocks within superblock 614, a processing sequence for generating analytics information is initiated in response to the message/alarm at block 612. At block 616, the log management host determines whether an analytics profile request is currently active for the target system entity and/or the performance metric type specified at block 612. For example an analytics profile request may comprise an analytics information request that uses the target system entity ID and/or the performance metric type as search keys. If an eligible search profile is currently active, the log management host utilizes the retrieves and transmits the corresponding analytics information to the client application (block 618). At block 620, the client application generates and displays one or more analytics objects based on the analytics information.

Returning to block 616, if an eligible search profile is not currently active, the log management host determines performance correlations between the specified target system entity (i.e., entity associated with the specified target system entity ID) and target system entities in other service domains (block 622). For instance, the log management host may utilize the type or the numeric value of the performance metric value specified in the selected metric object to determine a performance correlation. In addition or alternatively, the log management host may utilize operational associations between target system entities residing in different service domains to determine the performance correlation. Based on the determined one or more performance correlations, the log management host generates a performance correlation profile and transmits a corresponding performance data request to monitoring system hosts of each of the service domains (block 624). For example, the performance data requests may each specify the IDs of target system entities in the respective domain that were identified as having a performance correlation at block 622.

The process of generating analytics information concludes as shown at block 624 with the log management host identifying, based on performance data supplied in response to the request at block 624, operational relations between the target system entity specified by the selected metric object and target system entities in other service domains. At block 628, the client application, individually or in cooperation with the log management host, displays one or more analytics objects based on the analytics information generated in superblock 614.

Figure 7:
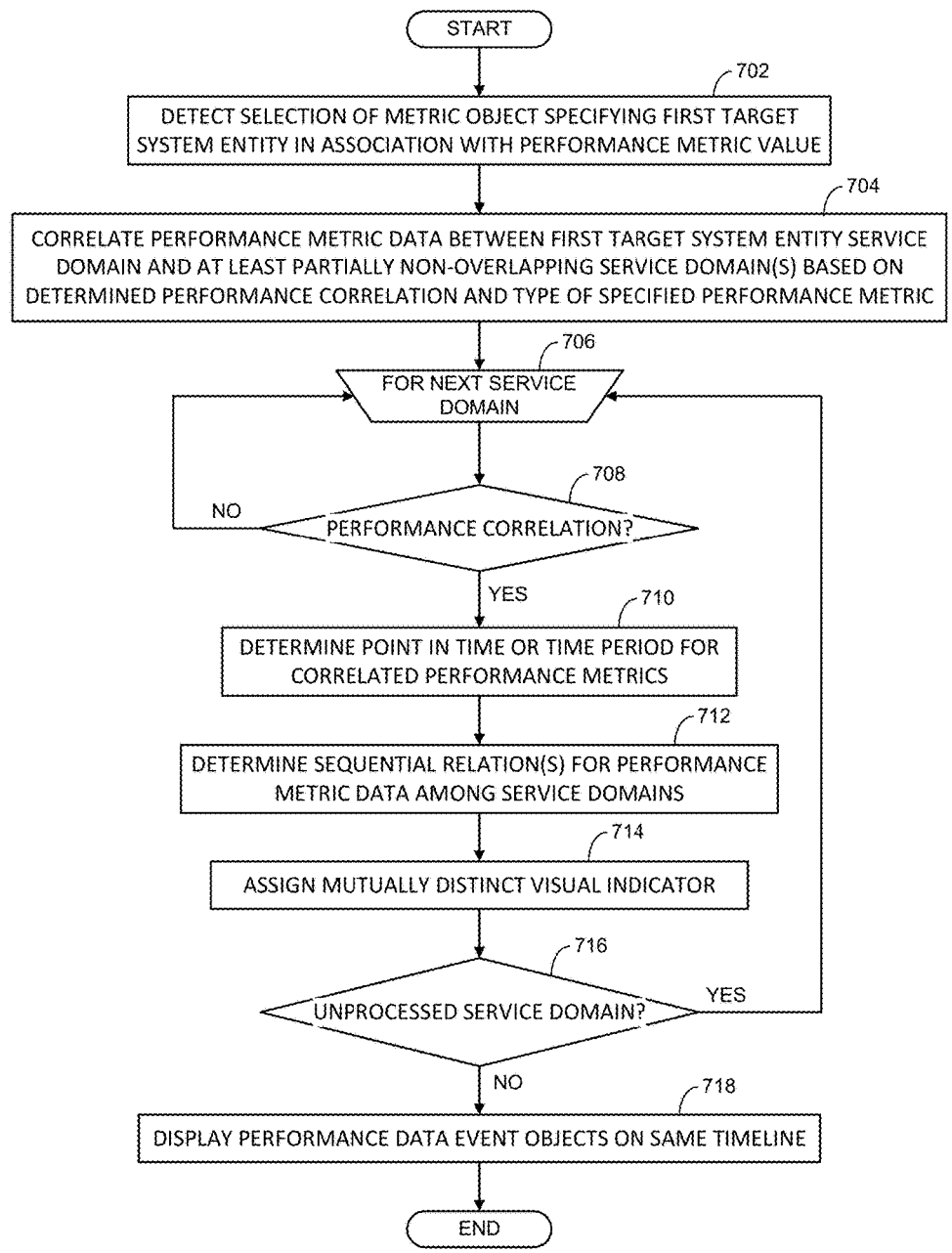
FIG. 7 is a flow diagram illustrating operations and functions for correlating cross-domain analytics objects in a contextual sequence in accordance with some embodiments.

FIG. 7 is a flow diagram illustrating operations and functions for correlating cross-domain analytics objects in a contextual sequence in accordance with some embodiments. For example, the operations and functions depicted in FIG. 7 may be performed by one or more of the systems, devices, and components described with reference to FIGS. 1-3 to generated correlated analytics objects such as depicted in FIG. 4C. The process begins as shown at block 702 with a monitoring client detecting an input selection of a displayed metric object such as may be displayed within a monitor console window. As with previously described metric objects, the selected metric object specifies a target system entity ID corresponding to a target system entity within a particular service domain. The selected metric object further associates the target system entity ID with a performance metric value.

In response to the selection, the client transmits a corresponding message to a log analytics unit requesting analytics data. In response, the log analytics unit determines correlations in performance metric data between the service domain to which the specified target system entity belongs and other service domains that are at least partially non-overlapping (block 704). The correlations may be determined based, at least in part, on performance correlations previously determined and recorded by a log management host.

Beginning at block 706, an analytics infrastructure that includes the log management host begin processing each of multiple service domains. Specifically, the log management host processes performance logs and configuration data within each of the service domains to determine whether performance correlations between the specified target system entity and target system entities in other service domains can be determined. In response to determining a performance correlation for a next of the other service domains, the log management host determines temporal data such as point-in-time occurrence and/or period over which the event(s) corresponding to the correlated performance data occurred (blocks 708 and 710). The log management host further determines the relative sequential positioning of the event(s) with respect to other events for previously processed service domains (block 712). At block 714 either the log management host or the client application assigns a mutually distinct visual identifier (e.g., a color coding) to a corresponding service domain specific data event object. Following processing each of the set of service domains for a particular target system is complete (block 716), the monitoring client displays each of the resultant data event objects on a same timeline.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
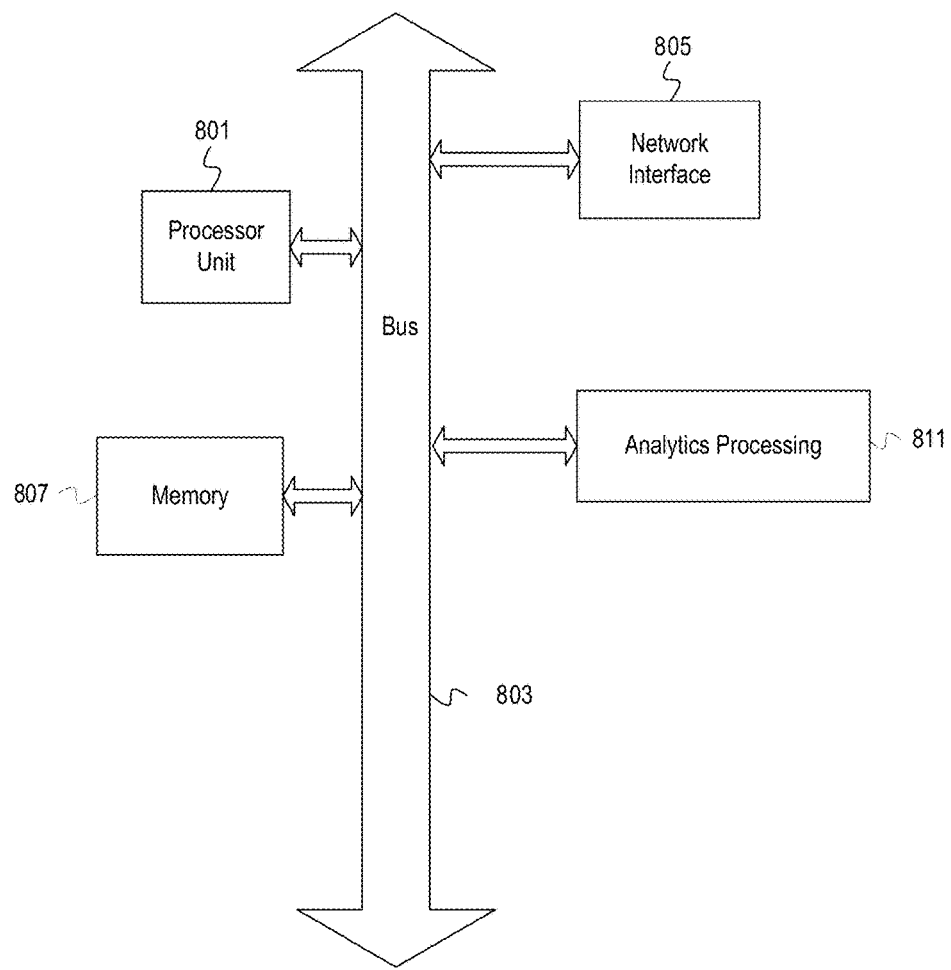
FIG. 8 is a block diagram depicting an example computer system that implements analytics information rendering in accordance with some embodiments.

FIG. 8 depicts an example computer system that implements analytics presentation in a data processing environment in accordance with an embodiment. The computer system includes a processor unit 801 (possibly including multiple processors, multiple cores, multiple nodes, and/or implementing multi-threading, etc.). The computer system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 803 (e.g., PCI, ISA, PCI-Express, HyperTransport® bus, InfiniBand® bus, NuBus, etc.) and a network interface 805 (e.g., a Fiber Channel interface, an Ethernet interface, an internet small computer system interface, SONET interface, wireless interface, etc.). The system also includes an analytics processing subsystem 811. Any one of the previously described functionalities may be partially (or entirely) implemented in hardware and/or on the processor unit 801. For example, the functionality may be implemented with an application specific integrated circuit, in logic implemented in the processor unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801 and the network interface 805 are coupled to the bus 803. Although illustrated as being coupled to the bus 803, the memory 807 may be coupled to the processor unit 801.

While the aspects of the disclosure are described with reference to various implementations and exploitations, it will be understood that these aspects are illustrative and that the scope of the claims is not limited to them. In general, techniques for presenting analytics data as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method for processing system management data, said method comprising:
   collecting performance data from multiple service domains that are each configured to determine performance metrics for one or more target system entities;
   monitoring performance data for a first of the service domains, said monitoring including,
      displaying metric objects representing variations in performance metrics for the first service domain; and
      detecting a performance event for the first service domain, wherein the performance event is associated with a target system entity and a performance metric value;
   in response to said detecting the performance event, displaying a metric object that indicates an association between an entity identifier (ID) of the target system entity and the performance metric value;
   identifying an operational association between the target system entity associated with the performance event and a second of the service domains; and
   in response to selection of the event object, displaying an analytics object that indicates analytics information generated based, at least in part, on,
      a metric type of the performance metric value; and
      the identified operational association between the target system entity associated with the performance event and the second service domain.

2. The method of claim 1, further comprising generating the analytics information based, at least in part, on performance metric data for a target system entity within the second service domain.

3. The method of claim 1, further comprising:
   determining whether an analytics profile request is currently active; and
   if an analytics profile request is currently active, generating the analytics information utilizing the active analytics profile request.

4. The method of claim 3, wherein the analytics profile request includes an information request that utilizes the target system entity ID and a metric type of the performance metric value as search keys.

5. The method of claim 1, further comprising:
   generating the analytics information, wherein said generating the analytics information includes,
      generating a search profile based, at least in part, on,
         a metric type of the performance metric value; and
         an entity type of a target system entity within the second service domain; and
      generating an information retrieval request based, at least in part, on the search profile.

6. The method of claim 5, further comprising transmitting the information retrieval request to a log management host that associates performance metric data between target system entities in different service domains.

7. The method of claim 5, wherein said generating a search profile comprises:
   selecting the metric type as a first search key for the search profile; and
   selecting the entity type as a second search key for the search profile.

8. One or more non-transitory machine-readable storage media comprising program code for processing system management data, the program code to:
   collect performance data from multiple service domains that are each configured to determine performance metrics for one or more target system entities;
   monitor performance data for a first of the service domains, the program code to monitor performance metrics including program code to,
      display metric objects representing variations in performance metrics for the first service domain; and
      detect a performance event for the first service domain, wherein the performance event is associated with a target system entity and a performance metric value;
   in response to said detecting the performance event, display a metric object that indicates an association between an entity identifier (ID) of the target system entity and the performance metric value;
   identify an operational association between the target system entity associated with the performance event and a second of the service domains; and
   in response to selection of the event object, display an analytics object that indicates analytics information generated based, at least in part, on,
      a metric type of the performance metric value; and
      the identified operational association between the target system entity associated with the performance event and the second service domain.

9. The one or more non-transitory machine-readable storage media of claim 8, wherein the program code further includes program code to generate the analytics information based, at least in part, on performance metric data for a target system entity within the second service domain.

10. The one or more non-transitory machine-readable storage media of claim 8, wherein the program code further includes program code to:
    determine whether an analytics profile request is currently active; and
    if an analytics profile request is currently active, generate the analytics information utilizing the active analytics profile request.

11. The one or more non-transitory machine-readable storage media of claim 10, wherein the analytics profile request includes an information request that utilizes the target system entity ID and a metric type of the performance metric value as search keys.

12. The one or more non-transitory machine-readable storage media of claim 8, wherein the program code further includes program code to:
    generate the analytics information, wherein said generating the analytics information includes,
       generating a search profile based, at least in part, on,
          a metric type of the performance metric value; and
          an entity type of a target system entity within the second service domain; and generating an information retrieval request based, at least in part, on the search profile.

13. The one or more non-transitory machine-readable storage media of claim 12, wherein the program code further includes program code to transmit the information retrieval request to a log management host that associates performance metric data between target system entities in different service domains.

14. The one or more non-transitory machine-readable storage media of claim 12, wherein the program code to generate a search profile comprises program code to:
   select the metric type as a first search key for the search profile; and
   select the entity type as a second search key for the search profile.

15. An apparatus comprising:
a processor; and
a machine-readable medium having program code executable by the processor to cause the apparatus to,
   collect performance data from multiple service domains that are each configured to determine performance metrics for one or more target system entities;
   monitor performance data for a first of the service domains, the program code executable by the processor to cause the apparatus to monitor performance metrics including program code executable by the processor to cause the apparatus to,
      display metric objects representing variations in performance metrics for the first service domain; and
      detect a performance event for the first service domain, wherein the performance event is associated with a target system entity and a performance metric value;
   in response to said detecting the performance event, display a metric object that indicates an association between an entity identifier (ID) of the target system entity and the performance metric value;
   identify an operational association between the target system entity associated with the performance event and a second of the service domains; and
   in response to selection of the event object, display an analytics object that indicates analytics information generated based, at least in part, on,
      a metric type of the performance metric value; and
      the identified operational association between the target system entity associated with the performance event and the second service domain.

16. The apparatus of claim 15, wherein the program code further includes program code executable by the processor to cause the apparatus to generate the analytics information based, at least in part, on performance metric data for a target system entity within the second service domain.

17. The apparatus of claim 15, wherein the program code further includes program code executable by the processor to cause the apparatus to:
   determine whether an analytics profile request is currently active; and
   if an analytics profile request is currently active, generate the analytics information utilizing the active analytics profile request.

18. The apparatus of claim 17, wherein the analytics profile request includes an information request that utilizes the target system entity ID and a metric type of the performance metric value as search keys.

19. The apparatus of claim 15, wherein the program code further includes program code executable by the processor to cause the apparatus to:
   generate the analytics information, wherein said generating the analytics information includes,
      generating a search profile based, at least in part, on,
         a metric type of the performance metric value; and
         an entity type of a target system entity within the second service domain; and
      generating an information retrieval request based, at least in part, on the search profile.

20. The apparatus of claim 19, wherein the program code executable by the processor to cause the apparatus to generate a search profile comprises program code executable by the processor to cause the apparatus to:
   select the metric type as a first search key for the search profile; and
   select the entity type as a second search key for the search profile.

* * * * *